United States Patent [19]

Pressman et al.

[11] Patent Number: 4,630,367
[45] Date of Patent: Dec. 23, 1986

[54] PRODUCE KNIFE WITH DEPTH-LIMITING AND PEEL AIDING FENCE

[76] Inventors: David Pressman, 1237 Chestnut St., San Francisco, Calif. 94109; Victor H. Goulter, 485 Molimo Dr., San Francisco, Calif. 94127

[21] Appl. No.: 621,607

[22] Filed: Jun. 18, 1984

[51] Int. Cl.$^4$ ............................................. B26B 3/00
[52] U.S. Cl. .................... 30/279 R; 30/290; 30/353
[58] Field of Search ............... 30/278, 279, 280, 294, 30/353, 284, 293, 346

[56] References Cited

U.S. PATENT DOCUMENTS

| | | |
|---|---|---|
| 21,695 | 10/1858 | Oot . |
| 602,758 | 4/1898 | Landers . |
| 757,550 | 4/1904 | Guest ............................. 30/279 R |
| 1,478,501 | 12/1923 | Woodin . |
| 1,488,200 | 3/1924 | Gehring . |
| 1,636,287 | 7/1927 | Clawson . |
| 1,746,116 | 2/1930 | Hult ................................ 30/279 R |
| 2,054,480 | 9/1936 | Leitshuh ............................. 30/20 |
| 2,083,368 | 6/1937 | Gambino ........................ 146/206 |
| 2,968,867 | 1/1961 | Wolff ................................ 30/284 |

FOREIGN PATENT DOCUMENTS

| | | |
|---|---|---|
| 69640 | of 1949 | Denmark . |
| 29592 | 8/1958 | Finland ................................ 30/278 |
| 1029924 | of 1953 | France . |

*Primary Examiner*—Douglas D. Watts
*Attorney, Agent, or Firm*—David Pressman

[57] ABSTRACT

A tool for performing cuts of controlled depth in orange rinds and the like for aiding in peeling same comprises a knife (28) with a side-cutting sharpened edge and fence means (30, 66) for limiting the depth of cut which can be made by said knife. The fence can be an integral member joined to the knife by a bend (26) or it can be a pair of side members which are adjustable in position from the edge. The width of the knife with an integral fence may be tapered so that various thicknesses of rinds can be accommodated. The integral fence can have a tongue (36) for aiding in peeling the rind. The knife can have a peeling slot (38) for apples or the like. The integral fence can have a sharpened forward edge (34) for making forward cuts, parallel to a cutting board (54).

7 Claims, 14 Drawing Figures

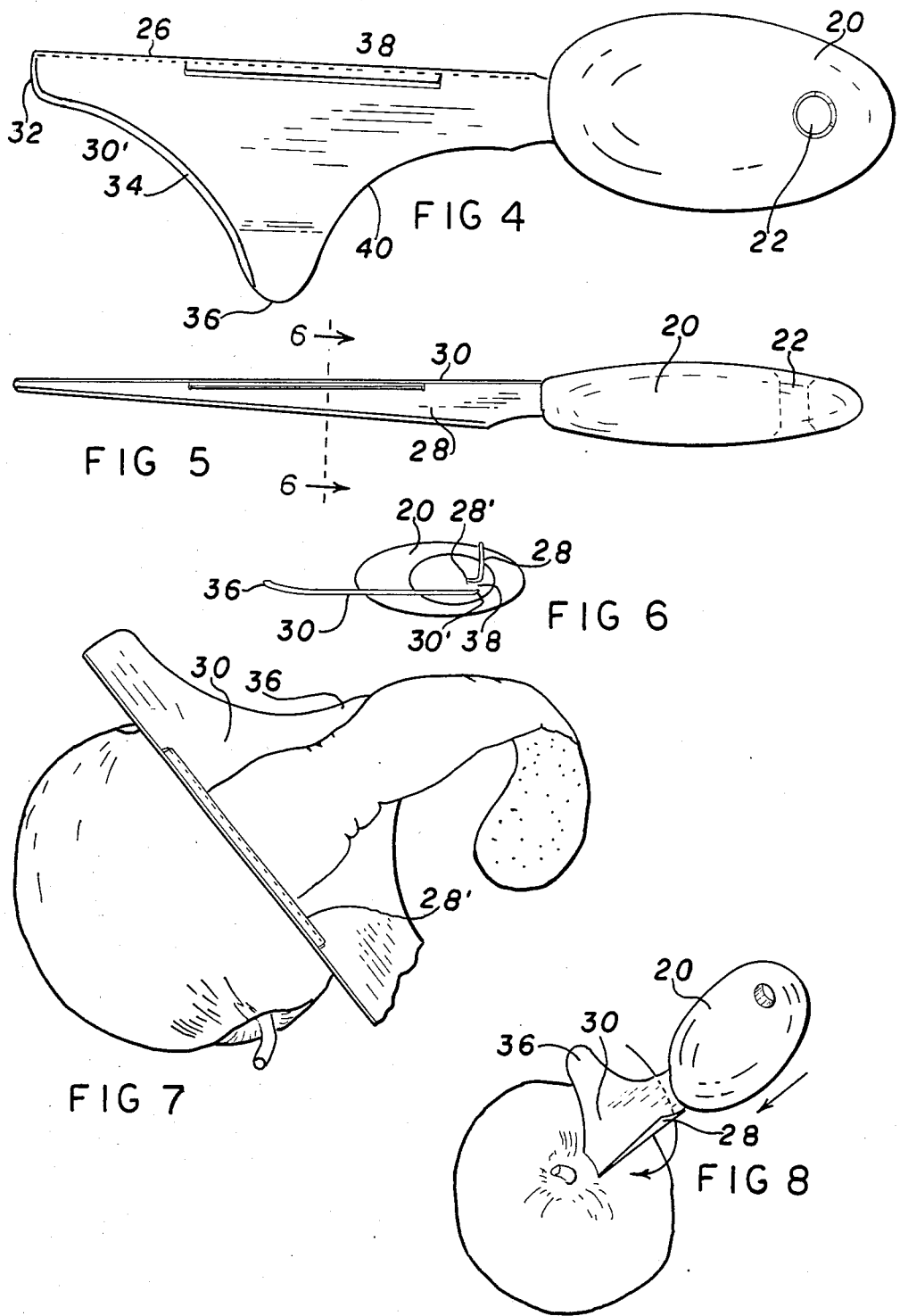

PRODUCE KNIFE WITH DEPTH-LIMITING AND PEEL AIDING FENCE

BACKGROUND

1. Field Of Invention

This invention relates to kitchen knives, especially to kitchen knives for use in cutting or scoring produce rinds to facilitate easy peeling thereof and for performing a wide variety of other functions.

2. Description of Prior Art

Many, if not most consumers of oranges (or other citrus and easily-peelable produce) prefer to peel their oranges before eating them in order to make such oranges easy to eat since once an orange is peeled, it can be easily separated into its segments, which are bite sized.

Heretofore a wide variety of kitchen tools have been proposed and implimented for peeling oranges.

One such tool consisted of a knife blade with a parallel guard. Users peeled the orange by holding the knife's blade tangent to the surface of the orange so that the guard controlled the thickness of the rind as it was peeled. Users regarded this type of tool as unsatisfactory for peeling oranges because the depth of the cut determined by the guard rarely matched the thickness of the orange's rind, thus forcing a user to remove either less than the entire thickness of the rind, or the entire thickness of the rind plus some of the pulp, which being very juicy, made the entire operation very messy. In essence, users found this type of tool unsatisfactory because it did not peel the rind at its natural junction with the pulp, which is an easy place to effect a separation.

Another type of tool comprised a simple bent rod which users had to insert under the rind and move around under and parallel to the rind's surface so as to separate the rind from the pulp. However this type of tool required some skill or training on the part of its users. Also it did not separate the rind beyond a small portion on its area, so that users had to tear off the rind in irregular pieces and then rely on their fingernails to separate the parts of rind which this tool did not separate.

Most users, therefore, would find it desirable to have a tool which could cut and facilitate a separation of an orange's rind more easily.

OBJECTS AND ADVANTAGES

Accordingly we claim the following as our objects and advantages of the invention: to provide a tool for easily, reliably, and neatly separating the rind from an orange or other rindable fruit, regardless of the thickness of such rind, to provide a tool for peeling oranges and other citrus or easily-peelable fruits at their natural junctions with their pulp, to provide such a tool which requires a minimum of skill and training to use, and to provide such a tool which can do a complete job of peeling, without the need to tear the rind or to use fingernails or the like.

In addition we claim the following additional object and advantages: to provide a kitchen tool which can peel produce with tightly bound skins, such as apples (in addition to fruits with loosely-bound rinds, such as oranges), to provide a tool which can core and gouge as well as peel, to provide a tool which can cut produce in a novel manner, parallel to the cutting board for increased safety and versatility, and to provide such a tool which can be adjusted for peeling produce of a variety of thicknesses.

Readers will find further objects and advantages of the invention from a consideration of the ensuing description and the accompanying drawings.

DRAWING FIGURES

FIG. 4 shows a back side view of such tool.

FIG. 5 shows a top view of such tool.

FIG. 6 shows a sectional end view of such tool taken along the line 6—6 of FIG. 5.

FIG. 7 shows a view of such tool in use peeling an apple.

FIG. 8 shows a view of such tool in use gouging out the stem portion of such apple.

Figure 1:
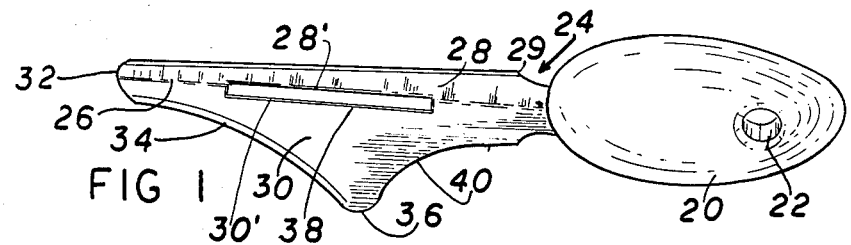
FIG. 1 shows a perspective back elevational view of a one-piece tool according to the invention.

DRAWING REFERENCE NUMERALS 20 handle
22 hole in 20
24 blade
26 bend in 24
28 side-cutting portion of 24
29 heel of 28
30 fence portion of 24
32 tip of 24
34 front edge of 30
36 tongue of 30
38 peeling slot of 30
40 back edge of 30
42 first cut in orange
44 second cut in orange
46 stem of orange
48 navel of orange
50 rind of orange
52 pulp of orange
54 cutting board
60 blade of adjustable knife
62 edge of 60
64 handle of adjustable knife
66 fence members on adjustable knife
68 pins holding 66
70 slots on 60
72 adjustment hoop of 66
74 adjustment knob for 72
76 bolt for 74
78 nails for 76

SINGLE-PIECE TOOL—DESCRIPTION

FIG. 1 shows a single-piece tool according to the preferred embodiment of the invention. The tool comprises a handle 20 which has a hole 22 for hanging the tool and which is preferably made of plastic which is molded onto the tang (not shown) of the tool's blade 24. Blade 24 comprises an elongated member about 10 cm long, preferably made of cutlery-steel, and which has a longitudinal, substantially right-angle bend 26 from the blade's tang to its tip 32. Bend 26 divides blade 24 into two portions: a side-cutting portion 28 and a fence (cut-limiting or stop) portion 30. Portion 30 also provides end-cutting and peeling functions.

Side-cutting portion 28 is about 8 cm long and has a varying width from bend 26 to its edge, the width increasing from about 2 mm at tip 32 to about 8 mm at its heel 29, near its tang and handle 20. From heel 29, the width of side-cutting portion 28 tapers down to where it meets handle 20. The edges of side-cutting portion 28, tip 32, and the front edge 34 of fence portion 30 are sharpened, as indicated.

Fence portion 30, best seen in FIG. 4, is flat and triagular in shape with its base at bend 26 and its tip (about 43 mm from the base) forms a tongue 36. A peeling slot 38 is framed at bend 26. Slot 38 (shown clearly in the end sectional view of FIG. 6) is about 5 cm long. Once edge 28' thereof, which is part of side-cutting portion 28, is bent inward (to the left in FIG. 6) so that it is offset by about 1.5 mm from fence portion 30 in the vertical direction in FIG. 6. The other edge 30' of slot 38, is sharpened. The sloping sides of the triangle, including front cutting edge 34 and its back edge 40, are slightly concave.

SINGLE-PIECE TOOL—OPERATION

The single-piece tool of FIG. 1 will perform a wide variety of produce-cutting functions, including peeling, cutting, gouging, etc., but users will find it most useful for peeling. For this function, users should employ side cutting portion 28 and tongue 36.

Figure 2:
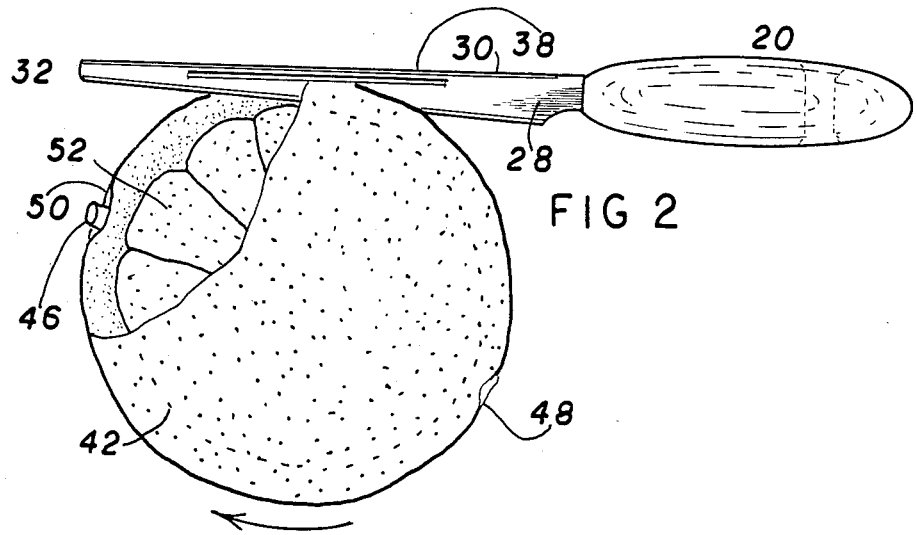
FIG. 2 shows a bottom view of such tool in use cutting the rind of an orange.
Figure 3:
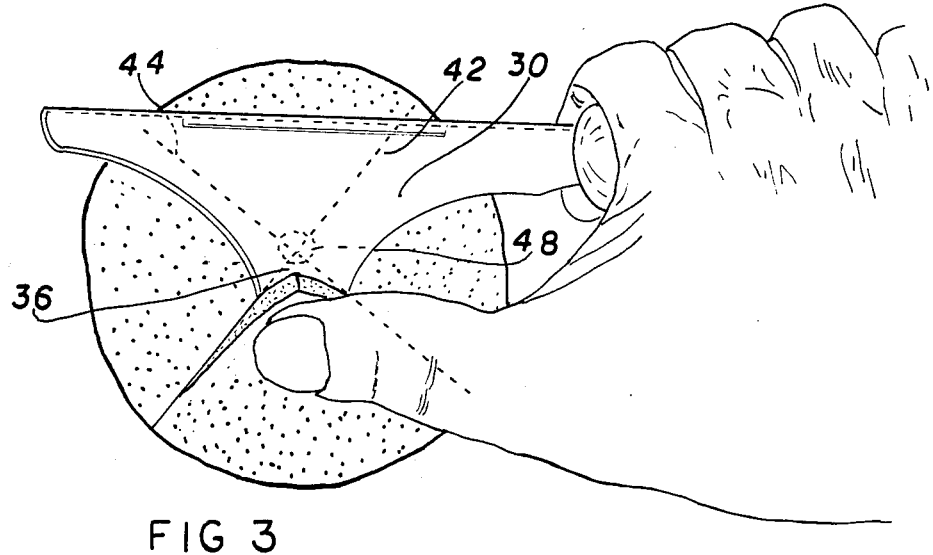
FIG. 3 shows a back view of such tool in use peeling the previously-cut rind of such orange.

To peel an easily-peelable item of produce, such as an orange or other citrus fruit, the user should use the sharpened edge of side cutting portion 28 to score or cut through the rind in two completely-encircling cuts, one of which can be seen shown at 42 in FIG. 2 and both of which can be seen at 42 and 44 in FIG. 3. Preferably the user should make the cuts in a longitudinal manner while holding the orange in its natural, tree-hanging position (i.e., with its stem end 46 at the top and its blossom or navel end 48 at the bottom), such that the cuts cross at the blossom and stem ends.

The user should make the cuts by first using the sharpened edge of cutting portion 28 to cut through the orange's rind 50. The user should insert the blade's tip 32 into the skin and then push the knife forward to a section of side-cutting portion 28 where the width of portion 28 is sufficient to sever through the complete thickness of rind 50 so as to reach pulp 52. The user can generally determine when the knife reaches this position, shown in FIG. 2, by sight, or even by feel since the pulp and its junction with the rind has a different cutting feel than the rind per se. If the rind is thin, as with a lemon or Valencia orange, the user should move the knife forward only slightly, to a position still close to tip 32, where portion 28 is still narrow. If the rind is thick, as with a navel orange or grapefruit, the user should move the knife forward a greater distance, further from its tip, to a position at a wider section of portion 28, near handle 20.

After the user moves the knife forward to a position where side cutting portion 28 reaches the pulp, the user then should make the completely-encircling cut by rotating the orange with one hand as indicated while holding the knife in the same longitudinal (fore and aft) position with the other hand. The user should rotate the orange in this manner until cut 42 completely encircles the orange. During this operation, the user also should hold the orange against fence portion 30, which will control the depth of the cut, keeping it uniform and in conformity with the thickness of the rind.

The user should then repeat the process to make a second longitudinal cut 44 (FIG. 3). The rind of the orange is now cut through or scored in two completely-encircling longitudinal cuts 42 and 44; these divide such rind into four quarters.

Next, as shown in FIG. 3, the user employes tongue 36 of the knife to remove the quarters of the rind in the manner indicated in FIG. 3. I.e., the user should insert tongue 36 under one corner of one of the quarters of the rind and then pull the rind off with the aid of the tongue and the user's thumb. Usually the whole quarter of the rind will come off in one section, but if it is particularly weak, e.g., with an overripe orange, and the quarter tears, the user of the knife will be able to peel the quarter off in two portions, each starting at an opposite corner. The user then repeats the process for each of the other three quarters until the whole rind is removed.

While we have described the process of peeling an orange with the tool of the invention in some detail, in practice we have found that it can be performed very rapidly and neatly, usually in less than thirty seconds.

Apple Peeler: Users can also use the tool to peel items of produce with strongly-attached skins, such as apples, by using peeling slots 38. In this case, the user should hold fence portion 30 tangent to the apple, as shown in FIG. 7, with sharpened edge 30' (not shown in FIG. 7) of slot 38 held against the skin of the apple and with side-cutting portion 28 extending upright from the apple. Then the user should rotate the apple so that sharpened edge 30' of slot 30' of slot 38 will peel off the skin, as indicated.

Stem Portion Gouge: The user can also use the tool as a gouge to remove the stem section of apples or other items of produce where much of the pesticide settles. In this case the user should insert tip 32 of the tool into the top of the apple and then rotate either the tool or the apple, as shown in FIG. 8, until the stem portion of the apple becomes cut free. The user can also use the tool in this manner to de-eye potatoes, pineapples, etc.

Figure 9:
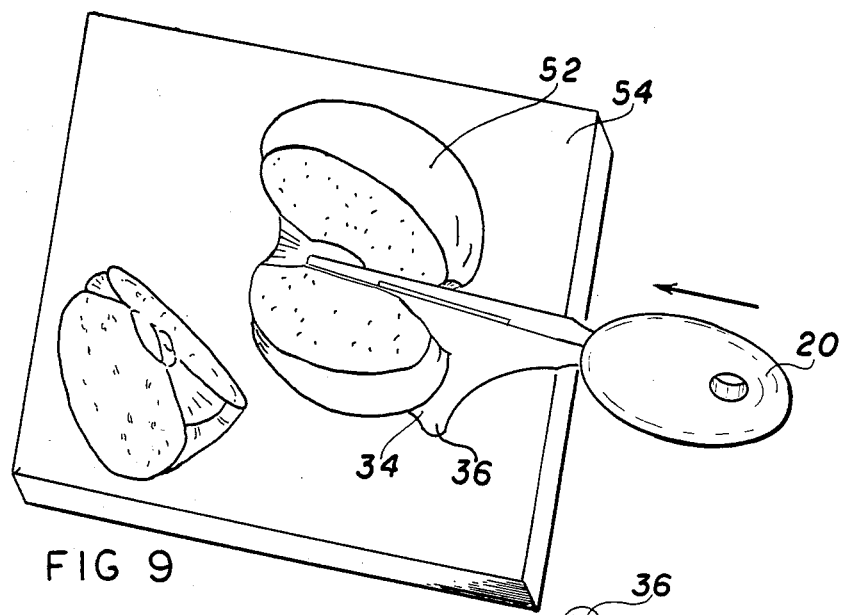
FIGS. 9 and 10 show views of such tool in use cutting said apple in a direction parallel to a cutting board.
Figure 10:
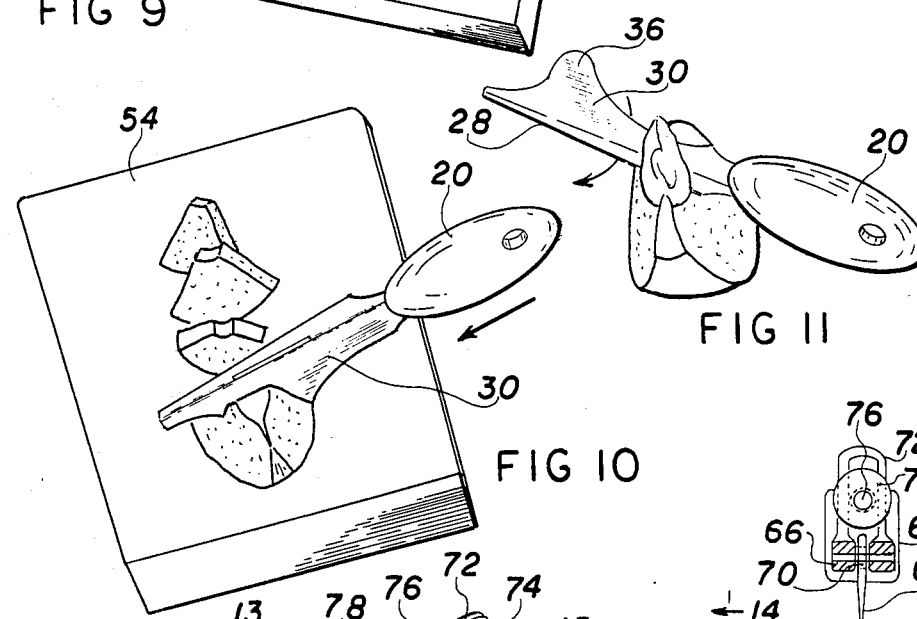

End Cutter: The user can also use the tool as an end cutter, i.e., a cutter which the user operates by moving it in a direction parallel, rather than perpendicular, to the cutting board, as shown in FIGS. 9 and 10. In this case the user holds the fruit, shown as an apple 52, against a cutting board or surface 54 and positions the tool with its tongue 36 on the board and the front cutting edge 34 (only part of which is shown in FIG. 9) against the apple. The user then moves the tool forward, parallel to board 54, whereupon edge 34 will sever the apple as indicated.

We have noted the following advantages with this mode of cutting, as opposed to the use of a conventional side-cutting knife: safety (the user pushes the knife away from himself or herself), a different mode of operation (providing an available alternative for the handicapped), preservation of equipment (the sharpened edge never touches the cutting board), and adaptability (cutting can be performed on a plate or countertop without damaging it or the shapened edge).

Figure 11:
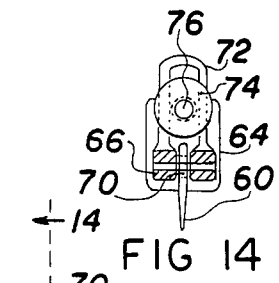
FIG. 11 shows a view of such tool in use gouging out a core portion of such apple.

Core Gouge: As shown in FIG. 11, users can also use the tool as a core or side gouge for apples and the like by employing the sharpened edge of cutting portion 28 as a side gouge, as indicated. The availability of a cutting portion of variable width with a limiting bend 26 enables this operation to be performed easily and accurately.

Adjustable Tool

Figure 14:
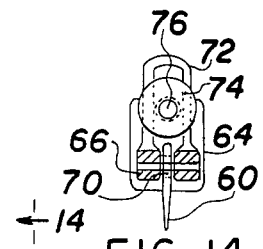
FIG. 14 is an end sectional view of the adjustabletool taken along the line 14—14 of FIG. 12.
Figure 12:
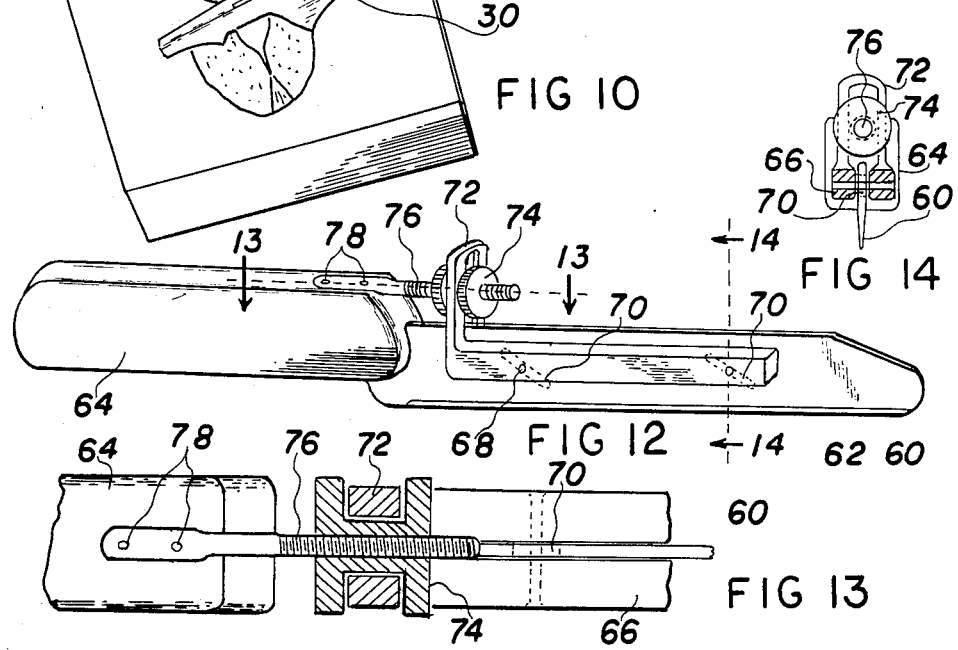
FIG. 12 shows an elevational, perspective view of an adjustable tool with a depth-of-cut control according to another embodiment of the invention.
Figure 13:
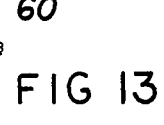
FIG. 13 is a top-sectional view of the adjustable tool taken along the line 13—13 of FIG. 12.

FIGS. 12 to 14 show an adjustable tool according to another embodiment of the invention. Users can use this tool to score or cut through the rinds of easily peelable items of produce in the same manner as they can use the tool of FIG. 1.

The adjustable tool comprises a knife having a straight blade 60 which has a sharpened edge 62 and which is set into a handle 64. Blade 60 preferably is offset below handle 62, as indicated, to enable the knife, including its adjustment mechanism, to have a more symmetrical profile. A two-sided adjustable fence comprises two elongated members 66 (preferably made of plastic) positioned on the respective sides of blade 60, parallel to and spaced up from its edge 62. Elongated members 66 are interconnected together and are fixed to blade 60 by means of two spaced interconnecting pins which pass through respective slanted slots 70 in blade 60. The back ends of fence members 66 extend up to form a follower hoop 72, best seen in FIG. 14. A dual-adjustment knob 74 sandwiches hoop 72 and is threaded onto a bolt 76 which is fixed to handle 64 at its back end by two nails or screws 78.

In operation, the user firsts adjusts the fence of the knife to the thickness of the rind to be scored or cut by turning adjustment knob 74 manually. Turning knob 74 so that it moves forward will force the fence forward and down because its joinder pins 68 will have to follow forwardly-slanting slots 70, thereby to set the fence members close to edge 62 so as to match the thickness of thin-skinned oranges. Turning knob so that it moves back toward handle 64 will cause the fence to move up and back, thereby positioning the fence relatively far from the blade's edge so as to accommodate thick-skinned oranges or the like.

Users will find the tool of FIGS. 12 to 14 advantageous since it can be set once for any lot of fruit and then used in any position along its blade. Users can also use the knife for making uniform partial-thickness cuts in any material, including non-edible substances.

While the above description contains many specificities, the reader should not construe these as limitations on the scope of the invention, but merely as exemplifications of preferred embodiments thereof. Those skilled in the art will envision many other possible variations are within its scope. For example skilled artisans will readily be able to change the dimensions and shapes of the various embodiments. They will also be able to make the knife of alternative materials, such as plastics and wood. They can make many variations on the adjustment mechanism of FIGS. 12 to 14, e.g., they can make the knife slotless but with fixed pins attached thereto and with the slanted slots made in the fence members instead of the blade. They can make the fence portions (as in FIG. 12) non-adjustable and integral with or bolted onto the blade; in this case they would set the fence for an average-thickness orange rind or the manufacturer would supply a plurality of knives with different fence settings. As an alternative on the foregoing, they can mount the fence portions at an angle to the sharpened edge with the forward or distal part of the fence close to the edge and the rearward (proximal) part thereof away from the edge so that the thickness of the cut can be controlled by the fore and aft position of the knife when cutting, as with the embodiment of FIG. 1. They can form the knife by extrusion or machining so that it is a one-piece unit with a T-shaped cross-section, when seen from its tip as in FIG. 14, so that the top bar of the T serves as the cut-limiting fence. In fact they can provide any type of protrusion or one or both sides of the knife for limiting the depth of cut which the knife can make in the direction perpendicular to its side cutting edge. Accordingly the reader is requested to determine the scope of the invention by the appended claims and their legal equivalents, and not by the examples which have been given.

We claim:

1. A knife for making cuts of controlled predetermined, variable depths for cutting through orange skins or the like which have a thickness within a predetermined range, comprising, in combination:

an elongated, flat, side-cutting blade, one elongated edge thereof being sharpened, said blade having a tip at a distal end thereof and a heel at a proximal end thereof, a handle, at said heel of said blade, for manually holding said blade at said heel thereof so that said blade extends out of said handle and so that said sharpened edge of said blade can be manually used to cut at least partially through an object in a cutting direction which is generally perpendicular to said direction of elongation of said edge and parallel to the plane of said blade, and fence means (a) mounted on and attached to at least one side of said blades, (b) comprising an outward protrusion perpendicular to said blade and spaced back and away from said sharpened edge of said blade, and (c) arranged to limit the depth of cut which can be made by said blade in said cutting direction to any selected value within said predetermined range such that blade can be used to cut through produce skins in a direction perpendicular to such skins and through any skin thickness in said predetermined range, and so that said outward protrusion will limit the depth of cut which can be made by said blade to any selected value within said predetermined range without cuttng into the flesh of said orange skin or the like, said outward protrusion comprising a tongue portion for facilitating peeling of an orange rind, whereby said blade can be used to cut directly through produce skins of any thickness within said predetermined range without cutting into the flesh thereof.

2. A knife for making cuts of controlled predetermined, variable depths for cutting through orange skins or the like which have a thickness within a predetermined range, comprising, in combination:

an elongated, flat, side-cutting blade, one elongated edge thereof being sharpened, said blade having a tip at a distal end thereof and a heel at a proximal end thereof, a handle, at said heel of said blade, for manually holding said blade at said heel thereof so that said blade extends out of said handle and so that said sharpened edge of said blade can be manually used to cut at least partially through an object in a cutting direction which is generally perpendicular to said direction of elongation of said edge and parallel to the plane of said blade, and fence means (a) mounted on and attached to at least one side of said blade, (b) comprising an outward protrusion perpendicular to said blade and spaced back and away from said sharpened edge of said blade, and (c) arranged to limit the depth of cut which can be made by said blade in said cutting direction to any selected value within said predetermined range such that blade can be used to cut through produce skins in a direction perpendicular to such skins and through any skin thickness in said predetermined range, and so that said outward protrusion will limit the depth of cut which can be made by said blade to any selected value within said predetermined range without cutting into the flesh of said orange skins or the like, said outward protrusion being integrally joined to said blade, said outward protrusion comprising a flat, elongated member which is joined to said blade at a substantially right-angle bend, said outward protrusion being generally triangular in shape and having a tongue portion comprising an apex of the triangle, whereby said blade can be used to cut directly through produce skins of any thickness within said predetermined range without cutting into the flesh thereof.

3. The knife of claim 2, further including a peeling slot adjacent and parallel to said right angle bend.

4. The knife of claim 2 wherein a forward side of said outward protrusion distal from said holding means is sharpened, whereby said knife can also be used to cut in a direction parallel to its direction of elongation.

5. A knife for scoring and peeling, comprising, in combination:

a manually-graspable handle, an elongated blade member extending forward from said handle, said blade member having a substantially right-angle bend parallel to its direction of elongation so as to divide said blade member into two portions, a blade portion and a fence portion, said blade portion being substantially flat and having a sharpened edge on a side thereof, said blade portion being mounted in said handle so that it can be used to cut in a direction perpendicular to said edge and parallel to the plane of said blade portion, said edge being oriented generally parallel to said direction of elongation, the width of said blade portion, from said sharpened edge thereof to said right-angle bend and said fence portion, tapering from a relatively small spacing at the end of said blade portion distal from said handle to a relatively large spacing at the opposite end thereof proximal to said handle so that said blade portion comprises a blade having a tapering depth within a predetermined range corresponding to a predetermined range of produce skin thicknesses, said fence portion protruding out from said blade portion at a substantially right angle to said blade portion and spaced back and away from said edge of said blade so as to limit the depth of cut which can be made by said blade portion, and so that said blade portion can be used to cut into produce skins in a direction perpendicular to such skins, said fence portion having a tongue thereon for aiding in peeling an orange, whereby said blade can be used to cut through any produce skin having a thickness within said range without cutting into the flesh thereof by using said blade at an appropriate location along the length thereof so that said fence portion will limit the depth of cut of said blade portion.

6. The knife of claim 5 wherein said fence portion has a generally-triangular shape, said tongue portion being an apex of the triangle.

7. The knife of claim 6 wherein a forward side of said fence portion, distal from said handle, is sharpened, whereby said knife can be used to cut in a forward direction.

* * * * *